US009836142B2

(12) United States Patent
Craig et al.

(10) Patent No.: US 9,836,142 B2
(45) Date of Patent: *Dec. 5, 2017

(54) CAPACITIVE ROTARY ENCODER

(71) Applicant: Panasonic Automotive Systems Company of America, Division of Panasonic Corporation of North America, Peachtree City, GA (US)

(72) Inventors: Larry V. Craig, Plymouth, MI (US); Sachiko Kurokawa Kobayashi, Novi, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/382,801

(22) Filed: Dec. 19, 2016

(65) Prior Publication Data

US 2017/0097694 A1   Apr. 6, 2017

Related U.S. Application Data

(63) Continuation of application No. 14/843,380, filed on Sep. 2, 2015, now Pat. No. 9,557,872, which is a
(Continued)

(51) Int. Cl.
*G06F 3/0362* (2013.01)
*G06F 3/044* (2006.01)
(Continued)

(52) U.S. Cl.
CPC ............ *G06F 3/0362* (2013.01); *G06F 3/016* (2013.01); *G06F 3/044* (2013.01); *G06F 3/0416* (2013.01); *G06T 11/60* (2013.01)

(58) Field of Classification Search
CPC .... G06F 3/03548; G06F 3/0362; G06F 3/041; G06F 3/044
(Continued)

(56) References Cited

U.S. PATENT DOCUMENTS 9,158,422 B2 * 10/2015 Craig ...................... G06F 3/044
9,557,872 B2 *  1/2017 Craig ...................... G06F 3/044
(Continued)

OTHER PUBLICATIONS

Rown, Aaron, Apple Built Patent Surface Studio Before Microsoft Touchscreen, Express: Home of the Daily and Sunday Express—Science-Technology Section, Nov. 2, 2016, http://www.express.co.uk/life-style/science-technology/727523/Apple-Built-Patent-Surface-Studio-Before-Microsoft-Touchscreen.

*Primary Examiner* — Stephen Sherman
(74) *Attorney, Agent, or Firm* — Laurence S. Roach, Esq.

(57) ABSTRACT

A human machine interface includes a capacitive touch screen having a capacitive sensor. The capacitive touch screen displays text characters and/or graphical information. A control device is rotatably coupled to a structure such that the control device is superimposed over the screen. The control device includes at least one electrically conductive element. The control device rotates about an axis substantially perpendicular to the screen such that the at least one electrically conductive element follows the rotation of the control device. The capacitive sensor senses a rotational position of the at least one electrically conductive element.

20 Claims, 4 Drawing Sheets

Related U.S. Application Data continuation of application No. 13/715,330, filed on Dec. 14, 2012, now Pat. No. 9,158,422.

(51) Int. Cl.
*G06F 3/041* (2006.01)
*G06F 3/01* (2006.01)
*G06T 11/60* (2006.01)

(58) Field of Classification Search
USPC ........... 345/156, 173, 174; 178/18.01, 18.03, 178/18.06; 200/179, 600
See application file for complete search history.

(56) References Cited

U.S. PATENT DOCUMENTS

| | | | | |
|---|---|---|---|---|
| 2008/0211779 A1* | 9/2008 | Pryor | ................. | G01C 21/3664 |
| | | | | 345/173 |
| 2008/0238879 A1* | 10/2008 | Jaeger | ................. | G06F 3/03545 |
| | | | | 345/173 |
| 2010/0201893 A1* | 8/2010 | Pryor | .................... | B60K 35/00 |
| | | | | 348/744 |
| 2010/0265201 A1* | 10/2010 | Oh | ........................ | G06F 1/1626 |
| | | | | 345/173 |
| 2012/0194457 A1* | 8/2012 | Cannon | .................. | G06F 3/011 |
| | | | | 345/173 |

* cited by examiner

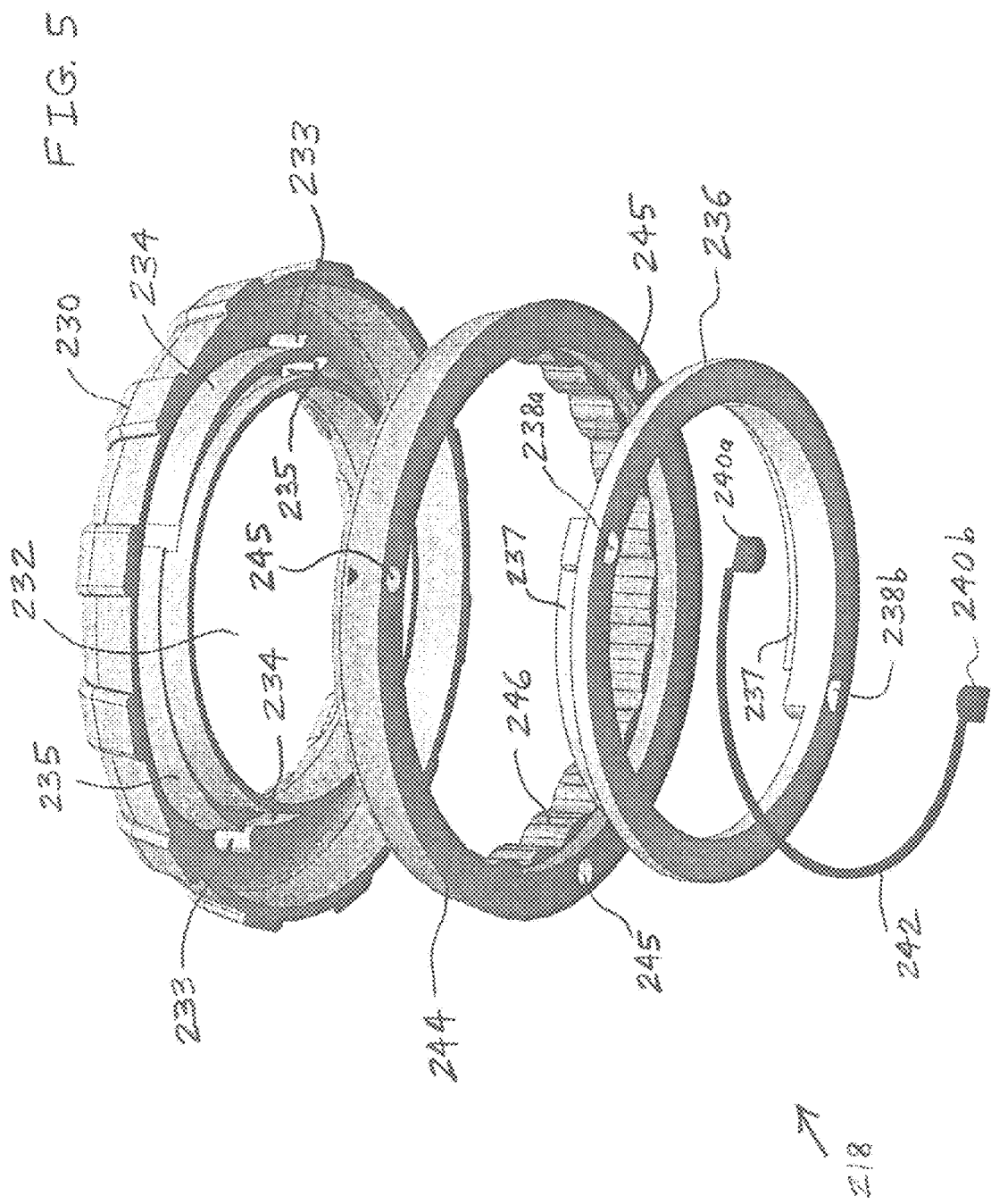

CAPACITIVE ROTARY ENCODER

CROSS-REFERENCE TO RELATED APPLICATION

This application is a continuation of U.S. patent application Ser. No. 14/843,380, filed on Sep. 2, 2015, now U.S. Pat. No. 9,557,872, issued on Jan. 31, 2017, which is a continuation of U.S. patent application Ser. No. 13/715,330, filed on Dec. 14, 2012, now U.S. Pat. No. 9,158,422, issued on Oct. 13, 2015, the disclosure of which is hereby incorporated by reference in its entirety for all purposes.

BACKGROUND OF THE INVENTION

1. Field of the Invention

The present invention relates to capacitive touch screens, and, more particularly, to a control device that is applied to a capacitive touch screen.

2. Description of the Related Art

Current systems require discrete rotary encoders and additional support circuitry attached to a printed circuit board, and are not able to be located over the active display area without obstructing the display from view. This not only occupies valuable display area, but also limits design freedom and the ability to dynamically assign and label the control function.

Other inventions targeted toward the automotive industry include projection type displays and camera-based pattern recognition to decode the controls which have been overlaid on the display surface. However, these known approaches have significantly higher costs than the present invention, and have yet to be automotive qualified.

SUMMARY OF THE INVENTION

The invention may include a mechanical rotary control device applied to a capacitive touch screen. Contacts on a control ring interact with a capacitive sensor which covers the display area on the display screen. Dynamic labels and/or control feedback may be displayed inside the control ring. With the use of an appropriate multitouch controller integrated circuit (IC), multiple control rings may be supported. Mechanical detents may be molded into the control ring structure and/or into the mechanical connection to the display lens in order to provide tactile feedback regarding how far the control ring has been rotated (i.e., in angular degrees) by the user.

The invention comprises, in one form thereof, a human machine interface including a capacitive touch screen having a capacitive sensor. The capacitive touch screen displays text characters and/or graphical information. A control device is rotatably coupled to a structure such that the control device is superimposed over the screen. The control device includes at least one electrically conductive element. The control device rotates about an axis substantially perpendicular to the screen such that the at least one electrically conductive element follows the rotation of the control device. The capacitive sensor senses a rotational position of the at least one electrically conductive element.

The invention comprises, in another form thereof, a method of operating a human machine interface, including providing a capacitive touch screen having a capacitive sensor. A control device is superimposed over the screen. The control device includes at least one electrically conductive element. The control device is rotatable about an axis substantially perpendicular to the screen such that the at least one electrically conductive element follows the rotation of the control device. Text characters and/or graphical information are displayed on the capacitive touch screen and adjacent to the control device. The text characters and/or graphical information are indicative of a function of the control device. The capacitive sensor is used to sense a rotational position of the at least one electrically conductive element.

The invention comprises, in yet another form thereof, a human machine interface including a capacitive touch screen having a capacitive sensor. The capacitive touch screen displays information to a user. A control device is rotatably coupled to a structure such that the control device is superimposed over the screen. The control device rotates about an axis substantially perpendicular to the screen. The control device includes a central viewing channel through which a user may view a portion of the information on the screen that is indicative of a function of the control device. The control device includes at least one electrically conductive element that follows the rotation of the control device. The capacitive sensor senses a rotational position of the at least one electrically conductive element.

An advantage of the present invention is that the touch screen may be re-programmable, and yet the advantages of a rotary dial are retained, such as tactile feedback and a fixed dial location which facilitates muscle memory.

Another advantage of the present invention is that it provides a well defined hand gesture area in which the hand gestures may be reliably captured by a camera and recognized by use of a gesture recognition algorithm.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein:

FIG. 5 is an exploded view of yet another embodiment of a capacitive rotary encoder suitable for use in the arrangement of FIG. 1.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
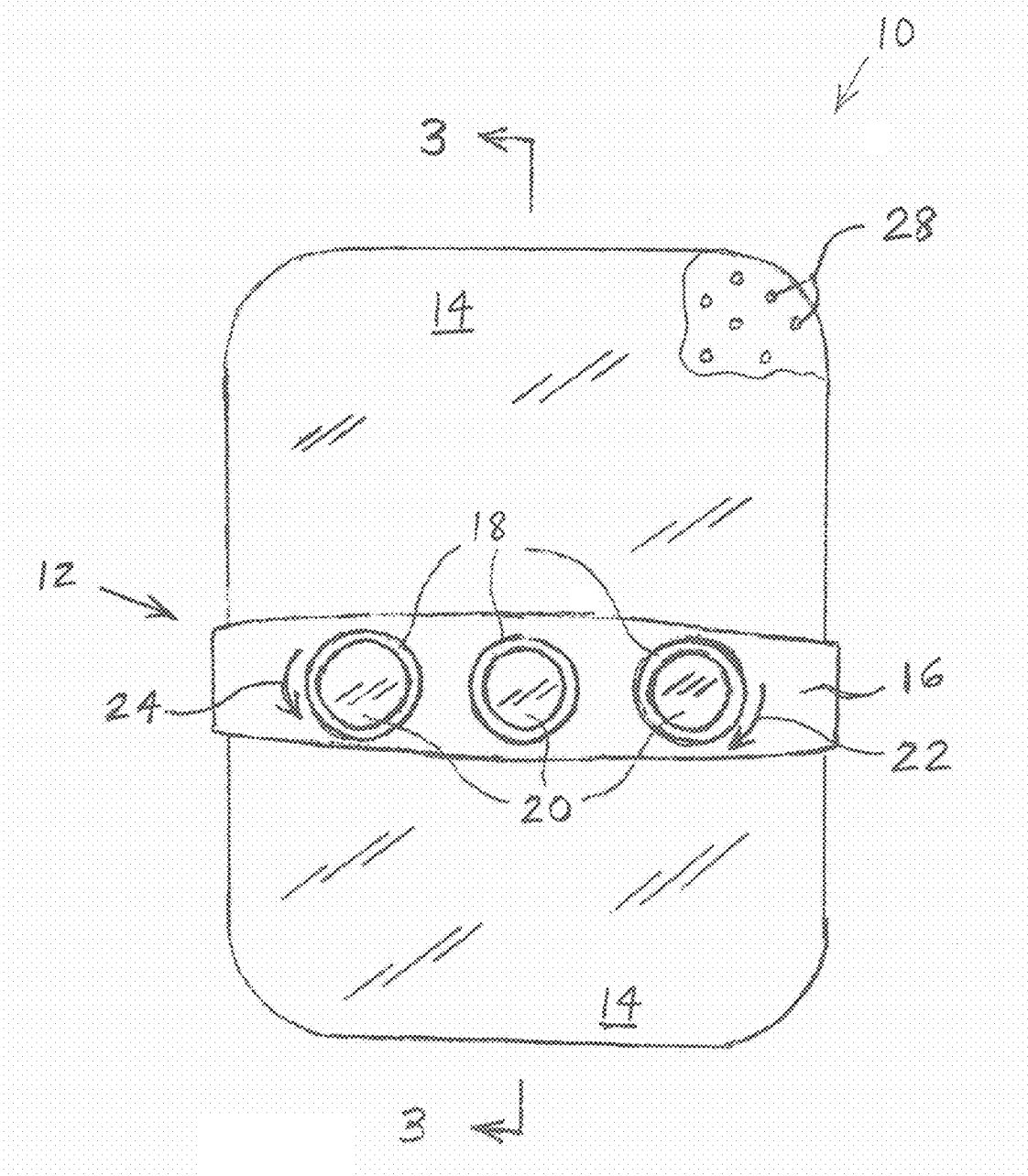
FIG. 1 is a plan view of one embodiment of a capacitive rotary encoder arrangement of the present invention.

FIG. 1 is a block diagram illustrating one embodiment of a human machine interface in the form of a capacitive rotary encoder arrangement 10 of the present invention, which may be included in a motor vehicle, for example. Arrangement 10 includes a rotary control overlay 12 disposed over, or superimposed over, a capacitive touch screen 14. Overlay 12 includes a planar band 16 having opposite longitudinal ends attached to screen 14. Band 16 may be a fixed structure that is formed of metal or a rigid plastic material, for example. Band 16 includes three throughholes each of which receives a respective annular capacitive rotary encoder or control device in the form of a dial or knob 18 that is rotatably coupled to band 16. Each of knobs 18 partially covers screen 14 and includes a central, circular viewing channel 20 having a longitudinal axis which is perpendicular to the page of FIG. 1. Viewing channel 20 may be empty or may retain a glass or transparent plastic window. Thus, a user is able to view screen 14 through viewing channel 20. Each of knobs 18 is rotatable in the plane of the page of FIG. 1, i.e., about its longitudinal axis, which is substantially perpendicular to screen 14, in both a clockwise direction 22 and a counter-clockwise direction 24. Knobs 18 may include detents (not shown) in order to provide the user with tactile feedback as he rotates the knob, as is well known with conventional automotive audio and HVAC knobs.

In one embodiment, knobs 18 do not include any wiring or electronics, but do include one or more capacitive contacts 26 (FIG. 2), which may be made of any electrically conductive material, such as metal or carbon fiber. In the specific embodiment of FIG. 2, there are two capacitive contacts 26 which are positioned to be diametrically opposed to each other within annular knob 18.

Figure 2:
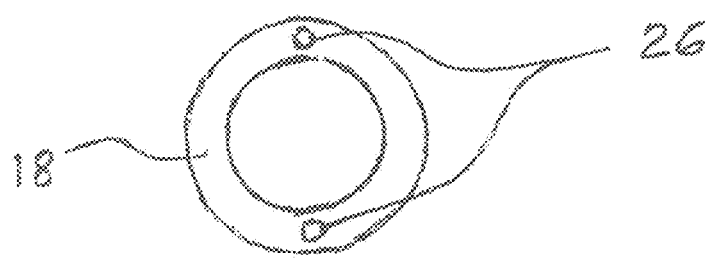
FIG. 2 is a cross-sectional plan view of one of the capacitive rotary encoders of the arrangement of FIG. 1.
Figures 3A, 3B:
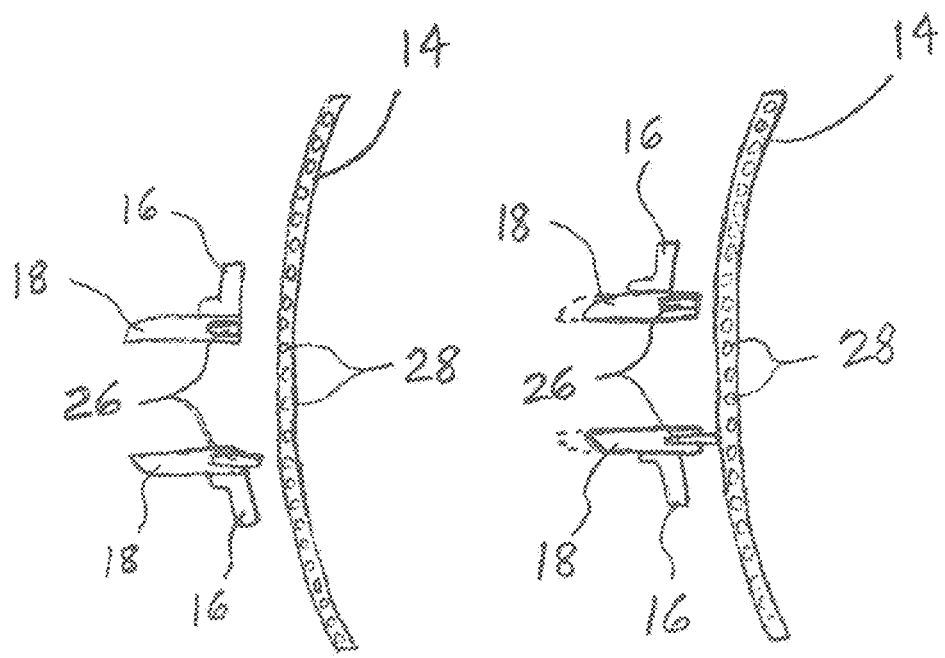
FIG. 3a is a cross-sectional view of the arrangement of FIG. 1 in a first position along line 3-3.
FIG. 3b is a cross-sectional view of the arrangement of FIG. 1 in a second position along line 3-3.

As shown in FIGS. 3*a*-*b* in conjunction with FIG. 2, each of capacitive contacts 26 may be rod-shaped with a longitudinal axis which is perpendicular to the pages of FIGS. 1 and 2. By being rod-shaped, contacts 26 may have a well defined or concentrated location relative to the screen, and yet the relatively longer length of the rods in directions toward and away from screen 14 may provide enough physical bulk to make contacts 26 easily sensed by a capacitive sensor, as described below. Contacts 26 may not extend the entire longitudinal length of knob 18, but rather may be disposed on the longitudinal end of knob 18 that is closer to screen 14, as shown in FIGS. 3*a*-*b*.

Capacitive touch screen 14 may include a capacitive sensor having a matrix of nodes 28 which are only fragmentarily shown in FIG. 1. The matrix of nodes 28 may extend the entire length of screen 14, as shown in FIGS. 3*a*-*b*, as well as the entire width of screen 14. Nodes 28 may each sense a level of capacitance which may be affected by the distance between node 28 and one or both of contacts 26. Each of nodes 28 may transmit a corresponding capacitance signal to a processor (not shown) which uses the capacitance signals to determine the locations of contacts 26 both in terms of rotational positions and in terms of the distance between contacts 26 and screen 14 in general. That is, as illustrated by FIGS. 3*a*-*b*, knobs 18 may be pushed by the user from the position in FIG. 3*a* to the position in FIG. 3*b* in which both knob 18 and hence contacts 26 are closer to screen 14. Thereby, the user may activate or select a menu selection or icon that is currently displayed on screen 14 through viewing channel 20. Knob 18 may be biased by a spring (not shown) back into the position of FIG. 3*a* after the user takes his finger off of knob 18 and stops pushing knob 18 toward screen 14.

Although knobs 18 are described with reference to FIGS. 3*a*-*b* as being movable in directions toward and away from screen 14, it is to be understood that the feature of knobs 18 being pushable is optional, and it is also possible for knobs 18 to be rotatable yet fixed in the direction into the page of FIG. 1. In this case, each of nodes 28 may transmit a corresponding capacitance signal to the processor which uses the capacitance signals to determine the locations of contacts 26 only in terms of rotational positions relative to screen 14. Contacts 26 may or may not touch or engage screen 14, and it is not necessary for contacts 26 to touch screen 14 in order for the capacitive sensor to sense the positions of contacts 26. In one embodiment, there are approximately between 750 and 800 nodes on screen 14, which may be arranged in a matrix of about thirty rows and twenty-five columns.

As shown in FIGS. 3*a*-*b*, one contact 26 may be closer to screen 14 than the other contact 26, and may extend toward screen 14 farther than the other contact 26, and thus the closer contact 26 may provide a higher level of capacitance than does the other contact 26. Thereby, the processor may differentiate between and/or identify each of the two contacts 26. This may be useful in embodiments in which knob 18 has a range of rotational motion of at least 180 degrees, and it is thus possible for either one of contacts 26 to be in a given position. For instance, the rotational position shown in FIG. 2 may correspond to a maximum sound volume, while a 180 degree rotation in counterclockwise direction 24 corresponds to a minimum sound volume, with the two contacts 26 effectively switching places in the two positions. By being able to identify which contact 26 is which, the processor may determine whether knob 18 is in the minimum volume position or the maximum volume position without having to reference any previous knob position information.

Figure 4:
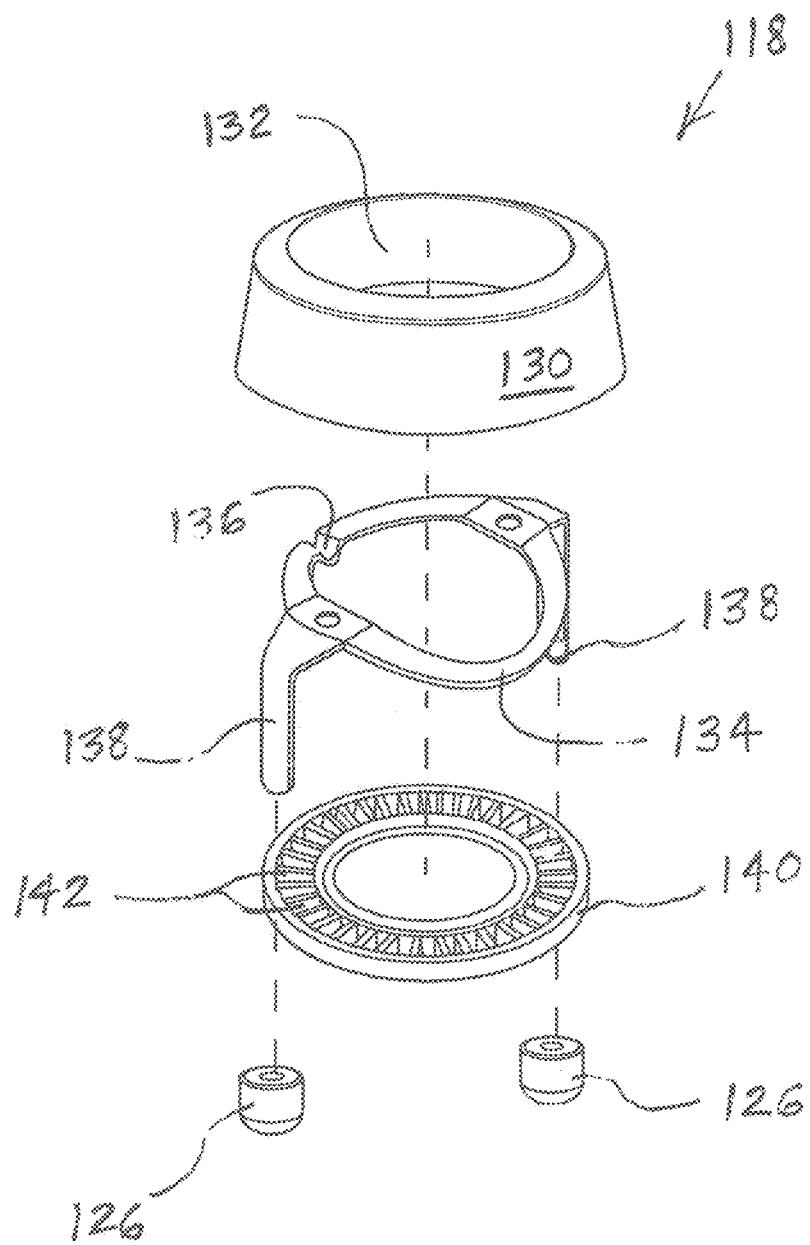
FIG. 4 is an exploded view of another embodiment of a capacitive rotary encoder suitable for use in the arrangement of FIG. 1.

Illustrated in FIG. 4 is an exploded view of another embodiment of a capacitive rotary encoder 118 suitable for use in the arrangement of FIG. 1. As in the embodiment of FIGS. 1-3, capacitive rotary encoder 118 is in the form of a knob. Capacitive rotary encoder 118 includes an annular cap 130 with an open center 132. Received in cap 130 is a wave spring 134 including a projection 136 and two diametrically opposed legs 138. Two capacitive contacts 126 are each attached to a distal end of a respective leg 138. A fixed planar ring 140 includes circumferentially spaced notches 142 for engaging projection 136 and providing tactile feedback as cap 130 is rotated and projection 136 rotates from notch to notch.

Illustrated in FIG. 5 is an exploded view of yet another embodiment of a capacitive rotary encoder 218 suitable for use in the arrangement of FIG. 1. As in the embodiments of FIGS. 1-4, capacitive rotary encoder 218 is in the form of a knob. Capacitive rotary encoder 218 includes an annular cover or cap 230 with an open center 232. Received in cap 230, or formed integrally with cap 230, are two diametrically opposed hurricane springs 234. Each hurricane spring 234 spans about ninety degrees in circumferential directions. At a distal end of each hurricane spring 234 is a radially extending projection 233. Also received in cap 230, or formed integrally with cap 230, are two diametrically opposed female snaps 235. Each female snap 235 spans about ninety degrees in circumferential directions. A contact carrier 236 includes two diametrically opposed male snaps 237, each of which snaps into a respective one of female snaps 235. Each male snap 237 spans about ninety degrees in circumferential directions. Contact carrier 236 also includes two through holes 238*a*-*b*, each of which receives a respective one of contacts 240*a*-*b*. Contacts 240*a*-*b* are electrically connected by a contact bridge 242. A mounting ring 244 is received in cap 230 and includes radially inwardly-facing detents 246 which engage projections 233 of hurricane springs 234. Mounting ring 244 includes three mounting holes 245 by which ring 244 may be fixed relative to screen 14 such that cap 230 and contact carrier 236 are rotatable relative to ring 244. Detents 246 and projections 233 may cooperate to provide tactile feedback as cap 230 is rotated and projections 233 engage detents 246.

During use, text characters and/or graphical information such as icons may be displayed on screen 14 and may be viewable through viewing channels 20 to indicate the purpose, function or application corresponding to each of knobs 18, such as audio volume, radio frequency, HVAC temperature, fan speed, etc. In one embodiment, the mode or purpose of a knob 18 may be toggled or switched, via software, by pushing and releasing the knob. For example, pushing and releasing knob 18 may toggle the knob between audio volume and radio frequency, and the text characters and/or icon displayed within the knob's viewing channel may change accordingly. Thus, the invention allows for dynamic relabeling of the control by use of a graphical human machine interface (HMI) including screen 14.

Knobs 18 are shown as being held by band 16 in a same row across screen 14, however, it is to be understood that the knobs do not have to be in a same row or column within the scope of the invention. Rather, the knobs can be in any places relative to each other and relative to screen 14.

Screen 14 is shown in FIGS. 3a-b as having a concave shape. However, it is to be understood that screen 14 may have other shapes within the scope of the invention, e.g., flat or planar.

Although band 16 is described as being fixed, it is also possible for band 16 to be movable. For example, band 16 may be slidable in directions up and down the page of FIG. 1 such that knobs 18 may be placed over different menu selections on screen 14.

In another embodiment (not shown), a slider including a capacitive contact is slidable along one of the four edges of a rectangular capacitive screen. Capacitive sensor nodes along the edge of the screen may sense the location of the capacitive contact within the slider. Thus, the present invention may be applied to any movable control in order to sense the position of the control without the need for wiring or electronics.

In yet another embodiment (not shown), the present invention is applied to a resistive touch screen instead of a capacitive touch screen. Multi-touch support is possible for a resistive touch screen, but may depend upon even pressure being applied to the resistive touch screen for accurate gesture detection. By careful tuning of the mechanical force applied to the encoder contact points, accurate gesture detection may be achieved for a resistive touch screen that is able to support multi-touch inputs.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A human machine interface comprising:
   a capacitive touch screen including a capacitive sensor, the capacitive touch screen being configured to display text characters and/or graphical information; and
   a control device rotatably supported and superimposed over the screen, the control device including at least one electrically conductive element, the control device being configured to rotate about an axis substantially perpendicular to the screen such that the at least one electrically conductive element follows the rotation of the control device;
   wherein the capacitive sensor is configured to sense a rotational position of the at least one electrically conductive element; and
   wherein the control device includes a detent having a spring with two diametrically opposed legs, a respective said electrically conductive element being attached to a distal end of each of the legs.

2. The interface of claim 1 wherein the control device comprises a knob.

3. The interface of claim 1 wherein the screen is configured to display information adjacent to the control device, the information being indicative of a function of the control device.

4. The interface of claim 3 wherein the control device includes a central viewing channel through which a user may view the information on the screen.

5. The interface of claim 1 wherein the control device is movable in directions toward and away from the screen such that the at least one electrically conductive element follows the movement toward and away from the screen, the capacitive sensor being configured to sense a position of the at least one electrically conductive element in the directions toward and away from the screen.

6. The interface of claim 1, wherein the control device is coupled to a structure extending across the screen.

7. The interface of claim 1 wherein the at least one electrically conductive element comprises a first electrically conductive element and a second electrically conductive element, the first electrically conductive element being closer to the screen than is the second electrically conductive element, the capacitive sensor being configured to sense that the first electrically conductive element is closer to the screen than is the second electrically conductive element, the first electrically conductive element and the second electrically conductive element both being separated from the screen by a respective nonzero distance.

8. A method of operating a human machine interface, comprising the steps of:
   providing a capacitive touch screen including a capacitive sensor;
   superimposing a control device over the screen, the control device including at least one electrically conductive element, the control device being rotatable about an axis substantially perpendicular to the screen such that the at least one electrically conductive element follows the rotation of the control device;
   using the capacitive sensor to sense a rotational position of the at least one electrically conductive element;
   using the capacitive sensor to sense movement of the control device in directions toward and away from the screen such that the at least one electrically conductive element follows the movement toward and away from the screen, the capacitive sensor sensing positions of the at least one electrically conductive element in the directions toward and away from the screen;
   providing the control device with a detent having a spring with two legs, a respective said electrically conductive element being attached to a distal end of each of the legs; and
   using the detent to provide a user with tactile feedback in response to the user rotating the control device about the axis.

9. The method of claim 8 comprising the further step of adjusting an operating parameter of an audio system, an HVAC system, or a navigation system of a motor vehicle, the adjusting being dependent upon the sensed rotational position.

10. The method of claim 8 comprising the further step of displaying information on the screen adjacent to the control device, the information being indicative of a function of the control device.

11. The method of claim 10 wherein the control device includes a central viewing channel, the displaying step including displaying the information on the screen such that the information is visible through the central viewing channel.

12. The method of claim 8 comprising the further step of supporting the control device over the screen by use of a planar band extending across the screen.

13. The method of claim 8, further comprising displaying text characters and/or graphical information on the capacitive touch screen, the text characters and/or graphical information being indicative of a function of the control device.

14. A human machine interface comprising:
a capacitive touch screen including a capacitive sensor, the capacitive touch screen being configured to display information; and
a control device rotatably coupled to a structure such that the control device is superimposed over the screen, the control device being configured to rotate relative to the screen, the control device including at least one electrically conductive element that follows the rotation of the control device, the control device including a spring with at least one leg, a respective said electrically conductive element being attached to a distal end of each of the legs;
wherein the capacitive sensor is configured to sense a rotational position of the at least one electrically conductive element.

15. The interface of claim 14 wherein the control device comprises a knob.

16. The interface of claim 14 wherein the structure comprises a planar band extending across the screen.

17. The interface of claim 14 wherein the control device is movable in directions toward and away from the screen such that the at least one electrically conductive element follows the movement toward and away from the screen, the capacitive sensor being configured to sense a position of the at least one electrically conductive element in the directions toward and away from the screen.

18. The interface of claim 14 wherein the control device includes a wave spring with two diametrically opposed legs, a respective said electrically conductive element being attached to a distal end of each of the legs.

19. The interface of claim 14 wherein the control device comprises an annular knob, the control device including a central viewing channel through which a user may view a portion of the Information on the screen that is indicative of a function of the control device, the central viewing channel having a circular cross section.

20. The interface of claim 14 wherein the at least one electrically conductive element comprises a first electrically conductive element and a second electrically conductive element, the first electrically conductive element being diametrically opposed to the second electrically conductive element, the first electrically conductive element being closer to the screen than is the second electrically conductive element, the first electrically conductive element and the second electrically conductive element both being separated from the screen by a respective nonzero distance, the capacitive sensor being configured to sense:
that the first electrically conductive element is closer to the screen than is the second electrically conductive element; and
the respective rotational positions of the first electrically conductive element and the second electrically conductive element.

* * * * *